(12) United States Patent
Crotty, III

(10) Patent No.: US 7,025,399 B1
(45) Date of Patent: Apr. 11, 2006

(54) SUN VISOR ASSEMBLY

(75) Inventor: Willard E. Crotty, III, Quincy, MI (US)

(73) Assignee: Grupo Antolin North America, Inc., Auburn Hills, MI (US)

( * ) Notice: Subject to any disclaimer, the term of this patent is extended or adjusted under 35 U.S.C. 154(b) by 0 days.

(21) Appl. No.: 10/894,235

(22) Filed: Jul. 19, 2004

(51) Int. Cl.
*B60J 3/00* (2006.01)

(52) U.S. Cl. .................. 296/97.1; 296/97.5

(58) Field of Classification Search .......... 296/97.1, 296/97.8, 97.5
See application file for complete search history.

(56) References Cited

U.S. PATENT DOCUMENTS

| | | | | |
|---|---|---|---|---|
| 5,131,711 A | * | 7/1992 | Laferle | 296/97.1 |
| 5,887,933 A | * | 3/1999 | Peterson | 296/97.1 |
| 6,254,168 B1 | | 7/2001 | Crotty, III | |
| 6,302,467 B1 | | 10/2001 | Crotty, III et al. | |
| 6,367,861 B1 | | 4/2002 | Crotty, III et al. | |
| 6,409,245 B1 | | 6/2002 | Crotty, III et al. | |
| 6,450,560 B1 | * | 9/2002 | Sturt et al. | 296/97.2 |
| 6,527,328 B1 | | 3/2003 | Crotty, III et al. | |
| 6,557,920 B1 | | 5/2003 | Hobson et al. | |
| 6,585,308 B1 | * | 7/2003 | Sturt et al. | 296/97.8 |
| 6,612,637 B1 | * | 9/2003 | Crotty, III | 296/97.11 |
| 6,637,799 B1 | * | 10/2003 | Tiesler | 296/97.1 |
| 6,692,059 B1 | | 2/2004 | Mills | |

* cited by examiner

*Primary Examiner*—Patricia L. Engle
(74) *Attorney, Agent, or Firm*—Young & Basile, P.C.

(57) ABSTRACT

A sun visor assembly includes a foundation folded unto itself to form first and second foundation halves. A first skate member is secured to the first foundation half and includes a first rounded edge portion of predetermined radius. A second skate member is secured to the second foundation half and includes a second rounded edge portion of predetermined radius. The first and second rounded edge portions cooperatively define a rounded edge of predetermined radius. In an embodiment, one of the first and second skate members also includes a sun visor accessory support formation.

20 Claims, 3 Drawing Sheets

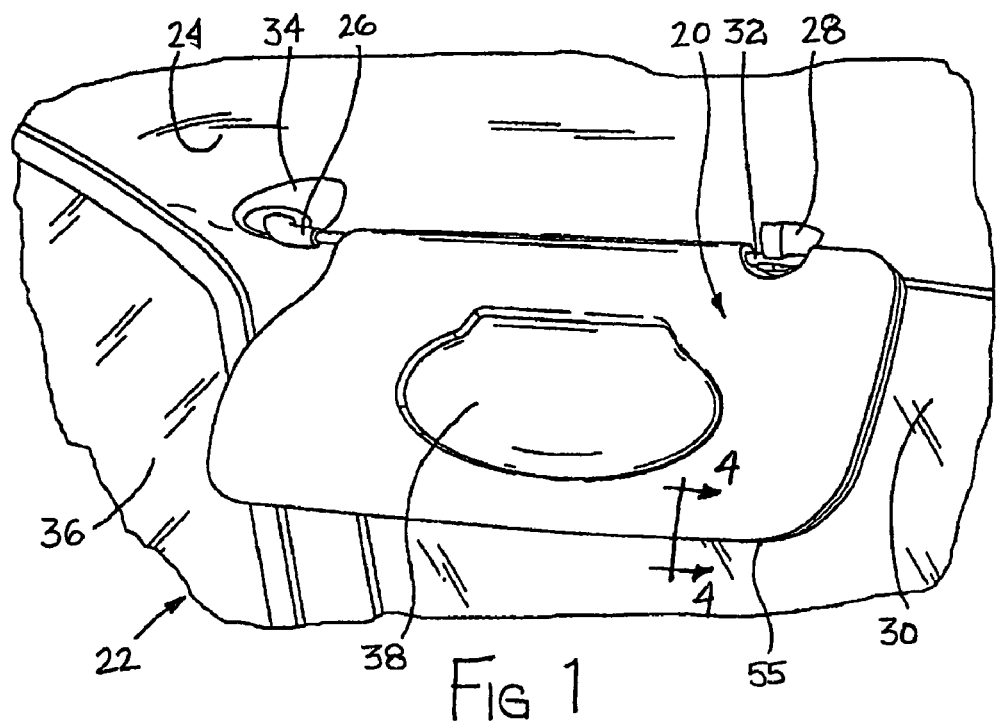
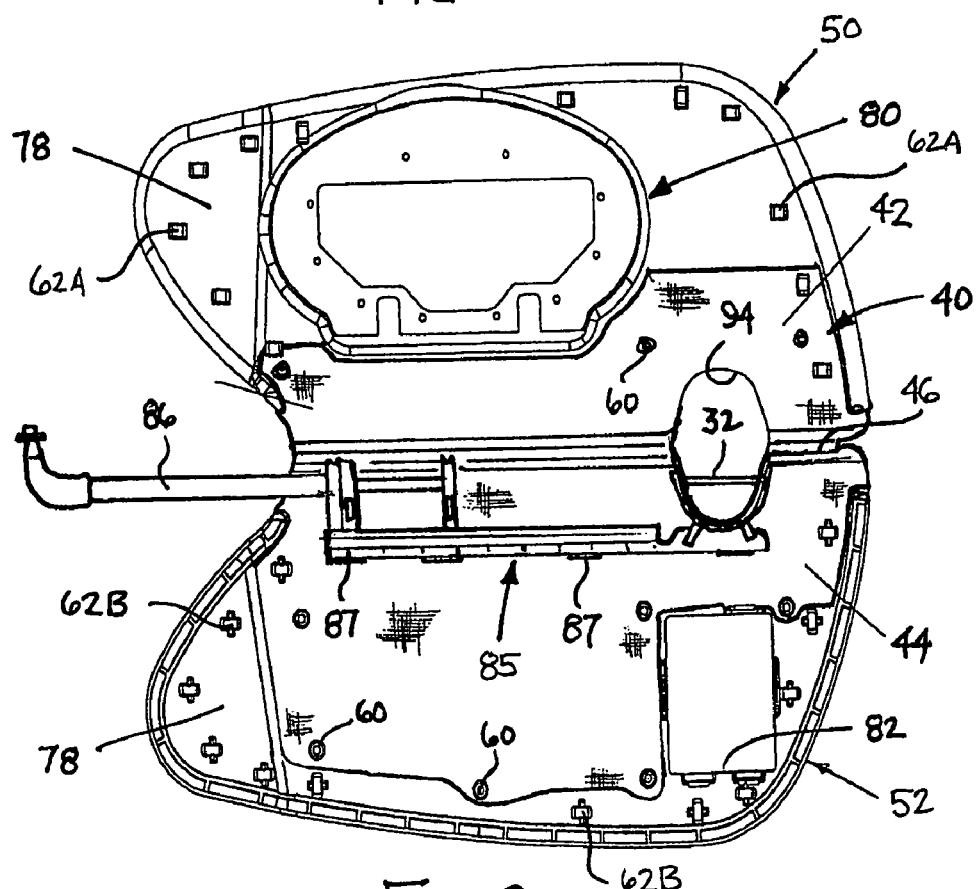

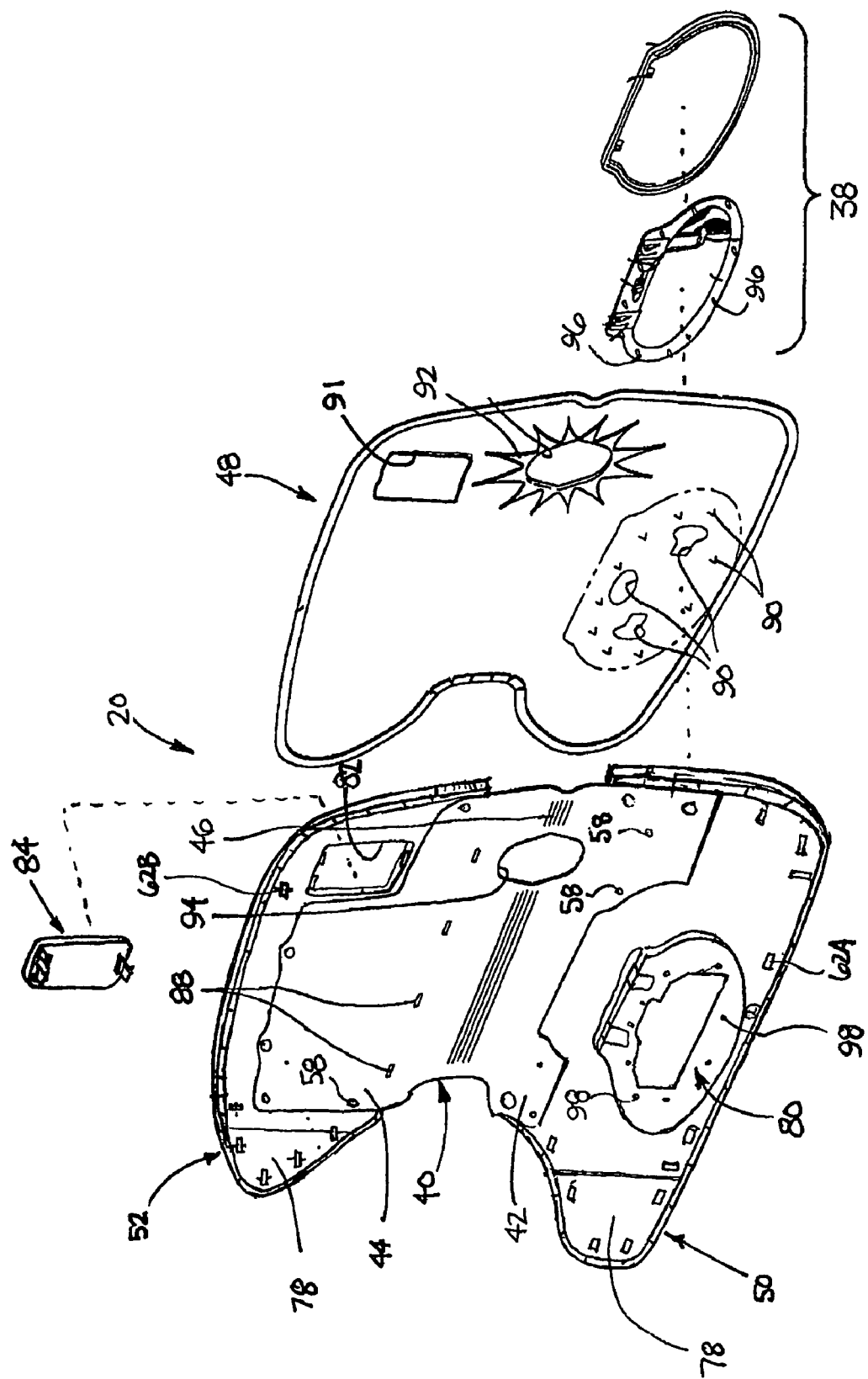

SUN VISOR ASSEMBLY

BACKGROUND OF THE INVENTION

1. Field of the Invention

The present invention relates generally to sun visors for vehicles and, more particularly, to a sun visor having a claim-shell foundation and a skate member that defines at least a portion of an edge of the sun visor.

2. Description of the Related Art

Over the past several decades, automobile designs have become safer in many respects, one of which relates to the interior compartment the driver and passengers occupy. Specifically, the design of dash boards, steering wheels, handles, control knobs and other interior components has become smoother and softer. Generally speaking, hard, protruding surfaces have been replaced with softer, rounded surfaces wherever possible. One interior component which has undergone such improvements is the sun visor.

One known sun visor design includes an outer cover assembly, which folds unto itself to define the shape of the sun visor assembly. The outer cover assembly is made of a cloth or vinyl upholstery covering, which is adhesively bonded to a semi-rigid foundation, typically formed of kraft paper. The upholstery cover is made larger than the foundation and thereby folds around the edges of the foundation. Thus, when the sun visor is folded in half, the outer edges of the cover assembly are sandwiched together and define the profile of the sun visor. A core member may be disposed between the foundation halves and connects to a rod, which in turn connects to the interior headliner of the vehicle.

A disadvantage associated with such known sun visor designs is that the two cover halves of the foldable foundation create an undesirable bifurcated edge when the halves are sandwiched together. This condition is unsatisfactory in vehicle applications that require contactable edges of a sun visor to exhibit a rounded edge. Accordingly, there is a need for an improved sun visor that overcomes the disadvantages of the prior art.

SUMMARY OF THE INVENTION

A sun visor assembly is provided that includes a foundation folded unto itself to form first and second foundation halves. A first skate member is secured to the first foundation half and includes a first rounded edge portion of predetermined radius. A second skate member is secured to the second foundation half and includes a second rounded edge portion of predetermined radius. The first and second rounded edge portions cooperatively define a rounded edge of predetermined radius. In an embodiment, one of the first and second skate members also includes a sun visor accessory support formation.

BRIEF DESCRIPTION OF THE DRAWINGS

Embodiments of the invention will now be described, by way of example, with reference to the accompanying drawings, wherein:

FIG. 1 is a perspective view of a sun visor assembly according to an embodiment of the present invention;

FIG. 2 is a plan view of the sun visor assembly of FIG. 1 shown in an unfolded condition;

FIG. 3 is an exploded perspective view of the sun visor assembly of FIGS. 1 and 2.

DETAILED DESCRIPTION OF THE INVENTION

Figure 4:
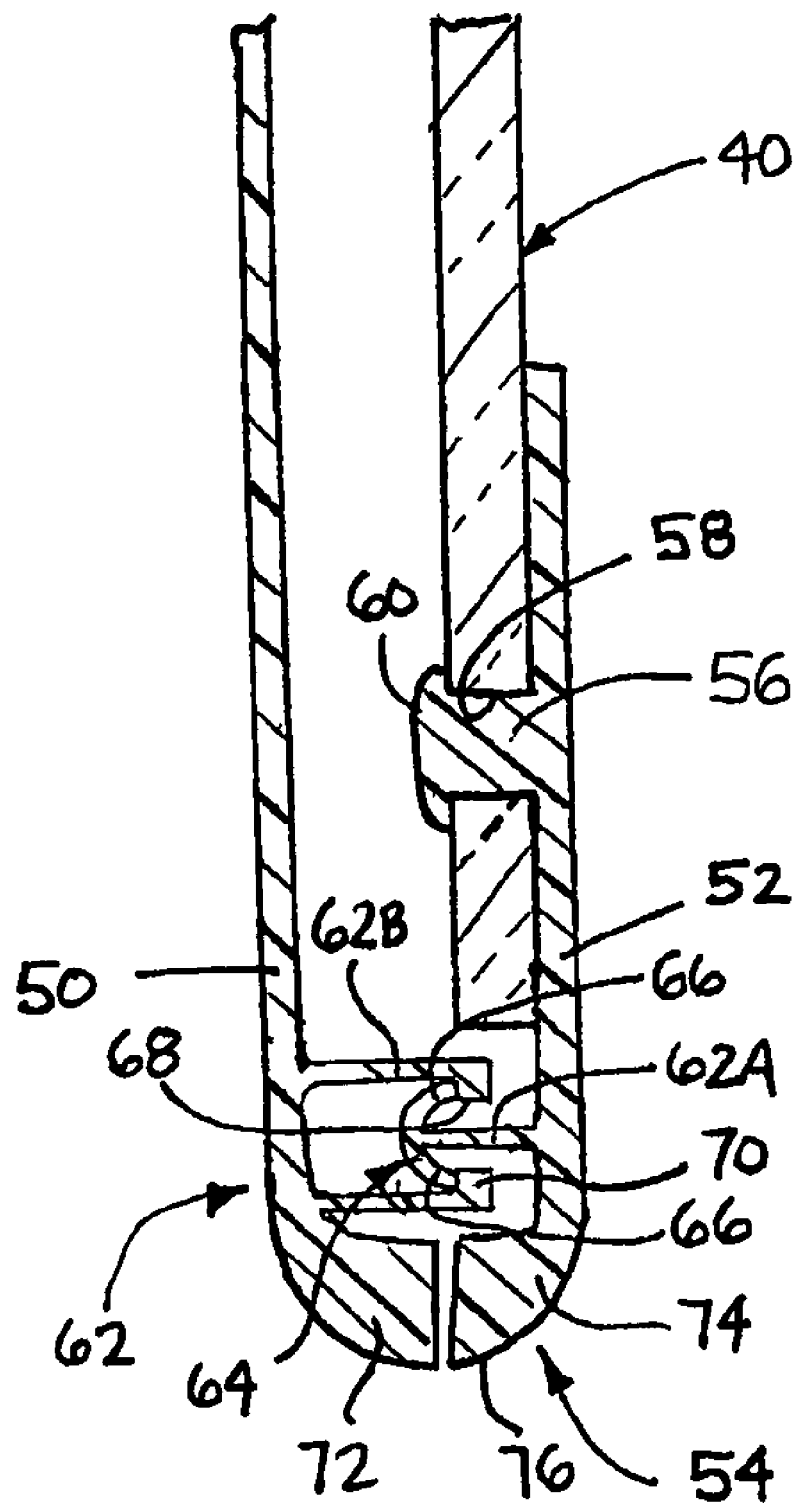
FIG. 4 is a detailed cross-sectional view of the sun visor of FIGS. 1–3.

Referring to FIG. 1, a sun visor assembly 20 is shown in a vehicle interior 22, wherein visor 20 is connected to a headliner 24 by a visor support rod assembly 26 on the left side and a retainer clip 28 on the right side. Sun visor 20 protects the occupant of the vehicle from bright sunlight and UV rays penetrating windshield 30. Sun visor 20 may be detached from a clip 28 by removing a pin 32 and pivoting the visor about a bracket assembly 34 to cover a side window 36. Sun visor assembly 20 includes a vanity mirror 38, which is attractively recessed within visor 20. A vanity mirror similar to that disclosed in FIGS. 1 and 3 is described in U.S. Pat. No. 6,254,168, which is owned by the Assignee of the present invention and is hereby incorporated by reference in its entirety.

Turning now to FIGS. 2–4, sun visor assembly 20 includes a substantially flat foundation 40 folded unto itself, thereby forming two foundation halves 42 and 44. In the embodiment shown in FIGS. 2–4, foundation 40 is formed of kraft paper or other structural material that is capable of being folded unto itself. To facilitate folding of foundation 40 unto itself, the foundation may include crease lines 46. An upholstery cover 48 covers foundation 40 and forms an exterior surface of visor assembly 20.

Attached to each half of foundation 40 is a skate member section 50, 52. As shown in FIG. 4, it will be appreciated that skate member sections 50 and 52 are pressed together to form a skate member 54 that partially defines an edge 55 of sun visor 20. In an embodiment, skate member sections 50 and 52 include plastic stakes 56 that fit through corresponding apertures 58 formed in foundation 40. FIG. 4 illustrates a stake 56 after heat has been applied thereto. As the plastic material, which is preferably polypropylene or ABS plastic, melts during heat staking, it forms a cap 60 that secures skate member sections 50 and 52 to foundation 40.

With further reference to FIGS. 2–4, and particularly FIG. 4, skate member sections 50 and 52 include a plurality of locking members 62. In an embodiment, locking members 62 include a locking post 62A and a corresponding receptacle 62B, which are configured to be secured together. In a particular configuration, locking post 62A includes a head portion 64 having a pair of resiliently deflectable barbs 66. Receptacle 62B includes a through hole 68 sized to inwardly deflect barbs 66 and an inner ledge 70 positioned to captured barbs 66 as they pass through hole 68 and expand.

As can be further appreciated from FIG. 4, skate member sections 50 and 52 are formed with substantially symmetrical bulbous portions 72 and 74, respectively. Bulbous portions 72 and 74 are aligned with one another and together define a rounded contactable edge portion 76. As may be appreciated with reference to FIG. 4, the surface of rounded edge portion 76 is of substantially semicircular cross-section and faces away from the sun visor, such that the edge of the sun visor forms a radius. It is preferable that the radius formed by the cross-sectional surface of rounded member 76 be at least about 3.2 mm, and more preferably at least about 3.5 mm. These dimensions permit skate member 54 to satisfy vehicle occupant safety standards and regulations promulgated by international authorities in the automotive industry.

Referring to FIGS. 2 and 3, each skate member section 42, 44 also includes an ear portion 78. Ear portions 78 cooperate with one another to form an ear when foundation 40 is folded unto itsef and skate member sections 42, 44 are secured together with locking members 62. The ear may be slightly bent relative to the remainder of skate member 54 to accommodate the contour of headliner 24.

Since skate member sections 42, 44 may be molded from plastic or other moldable or formable material to create bulbous portions 72 and 74, skate member sections 42, 44 may also be readily formed with sun visor accessory support formations, such as a vanity mirror recess 80 for receiving vanity mirror 38 or an opening 82 within which a sun visor accessory 84, such as a remote garage door operating device, is received. Unlike some prior art sun visors that require the kraft paper foundation to be molded to accommodate a vanity mirror or other sun visor accessory, the use of skate member sections 42, 44 allows these features to be readily created during the manufacture of the skate member sections themselves. This feature eliminates the manufacturing step of molding kraft paper, which is required in the prior art.

As shown in FIG. 2, sun visor assembly 20 also includes a track and slide-block arrangement 85 for movably supporting a visor support rod 86. For example, a suitable track and slide-block arrangement for use in sun visor assembly 20 is shown in FIG. 26 of U.S. Pat. No. 6,131,985, which is owned by the Assignee of the present invention and is hereby incorporated by reference in its entirety. Track and slide-block arrangement 85 may include feet 87, which are received in slots 88 formed in foundation half 44 (FIG. 3) and hold track and slide-block arrangement 85 in place within foundation 40.

The production process of sun visor 20 is substantially the same as is known in the art, except that it includes the additional step of securing skate member sections 42 and 44 to foundation 40 before securing cover 30 to foundation 40 and skate member 54. As an optional step, desirable when vanity mirror 38 includes lighting as in the disclosed embodiment, apertures 90 (FIG. 3) may be pre-formed into cover 48 before it is adhered to foundation 40 and skate member 54. Similarly, aperture 91 may be pre-formed in cover 48 to accommodate sun visor accessory 84. Advantageously, only the peripheral edge of cover 48 and a sawtooth edge 92 need be adhered to foundation 40 and skate member 54. Any one of several adhesives known in the art can be used for this purpose.

After cover 48 is adhered to foundation 40 and skate member 54, the interior components of sun visor assembly 20 are positioned within foundation 40 and skate member 54. Track and slide-block arrangement 85 can be pre-assembled and then placed into foundation 40 so that feet 87 fit into slots 88 and pin section 32 is received in cut-out 94 (FIG. 2) of foundation 40. Next, vanity mirror 38 may be pressed into recess 80 and stakes 96 on vanity mirror 39 may be fused into holes 98 in skate member section 50 using heat stake technology. It should also be noted that instead of heat staking, vanity mirror 38 and sun visor accessory 84 may be secured to their corresponding skate member section by a snap fit. Still further, vanity mirror 38 and sun visor accessory 84 may be secured to their corresponding skate member section by sonic welding. Advantageously, cover 48 is held securely in place between skate member section 50 and the back of mirror assembly 38.

Finally, the two halves 42, 50 and 44, 52 are folded and held together by locking members 62. As an alternative to using locking members 50 to secure foundation halves 42 and 44 together, an adhesive may be employed to adhere the two halves of the "clam-shell" visor together, thereby maintaining the sun visor in the assembled state shown in FIG. 4. Many suitable adhesives are known in the art and can be used to secure the foundation halves together, such as Plio Grip urethane sold by Ashland Chemical Company.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A sun visor assembly, comprising:
    a foundation folded unto itself to form first and second foundation halves;
    a first, separate, skate member secured substantially around the periphery of the first foundation half, the first skate member including a first rounded edge portion of predetermined radius;
    a second, separate, skate member secured substantially around the periphery of the second foundation half and including a second rounded edge portion of predetermined radius, the first and second rounded edge portions cooperatively defining a rounded edge of predetermined radius;
    a plurality of locking members carried on the first and second skate members for locking the first and second rounded edge portions together; and
    wherein one of the first and second skate members includes a sun visor accessory support formation.

2. The sun visor of claim 1, wherein the sun visor accessory support formation includes a recess.

3. The sun visor of claim 1, wherein the sun visor accessory support formation includes an opening.

4. The sun visor of claim 1, wherein one of the first and second skate members further includes an opening sized to receive a sun visor accessory.

5. The sun visor of claim 1, wherein the locking members comprise:
    one of the first and second skate members including a plurality of receptacles and the other of the first and second skate members including a plurality of projections configured to be received in and locked with a corresponding receptacle.

6. The sun visor of claim 1, wherein the first and second skate members further include a plurality of heat-deformed stakes for securing the skate members to the foundation.

7. The sun visor of claim 1 wherein the rounded edge includes a radius of at least about 3.2 mm.

8. The sun visor of claim 1, wherein the foundation is made of kraft paper.

9. A sun visor assembly, comprising:
    a foundation folded unto itself to form first and second foundation halves;
    a first, separate, skate member secured to the first foundation half, the first skate member including a first rounded edge portion of predetermined radius;
    a second, separate, skate member secured to the second foundation half and including a second rounded edge portion of predetermined radius, the first and second rounded edge portions cooperatively defining a rounded edge of predetermined radius;

a plurality of locking members carried on the first and second skate members for locking the first and second rounded edge portions together; and wherein the of the first and second skate members include an integrally formed ear portion, the ear portions cooperatively defining an ear.

10. The sun visor of claim 9, wherein one of the first and second skate members includes a sun visor accessory support formation.

11. The sun visor of claim 10, wherein the sun visor accessory support formation includes a recess.

12. The sun visor of claim 10, wherein the sun visor accessory support formation includes an opening.

13. The sun visor of claim 9, wherein the locking members comprise:

one of the first and second skate members including a plurality of receptacles and the other of the first and second skate members including a plurality of projections configured to be received in and locked with a corresponding receptacle.

14. The sun visor of claim 9, wherein the first and second skate members include a plurality of heat-deformed stakes for securing the skate members to the foundation.

15. The sun visor of claim 9, wherein the rounded edge includes a radius of at least about 3.2 mm.

16. A sun visor assembly, comprising:

a foundation folded unto itself to form first and second foundation halves;

a first skate member secured substantially around the periphery of the first foundation half;

a second skate member secured substantially around the periphery of the second foundation half; the first and second skate members cooperatively defining at least a portion of an edge of the sun visor assembly;

a plurality of locking members carried on the first and second skate members for locking the first and second skate members to each other about the periphery of the first and second foundation halves; and wherein one of the first and second skate members includes a sun visor accessory support formation.

17. The sun visor of claim 16, wherein the sun visor accessory support formation includes a recess.

18. The sun visor of claim 16, wherein the sun visor accessory support formation includes an opening.

19. The sun visor of claim 16, wherein the locking members comprise:

one of the first and second skate members including a plurality of receptacles and the other of the first and second skate members including a plurality of projections configured to be received in and locked with a corresponding receptacle.

20. The sun visor of claim 16, wherein the first and second skate members include a plurality of heat-deformed stakes for securing the skate members to the foundation.

\* \* \* \* \*